Figure 1:
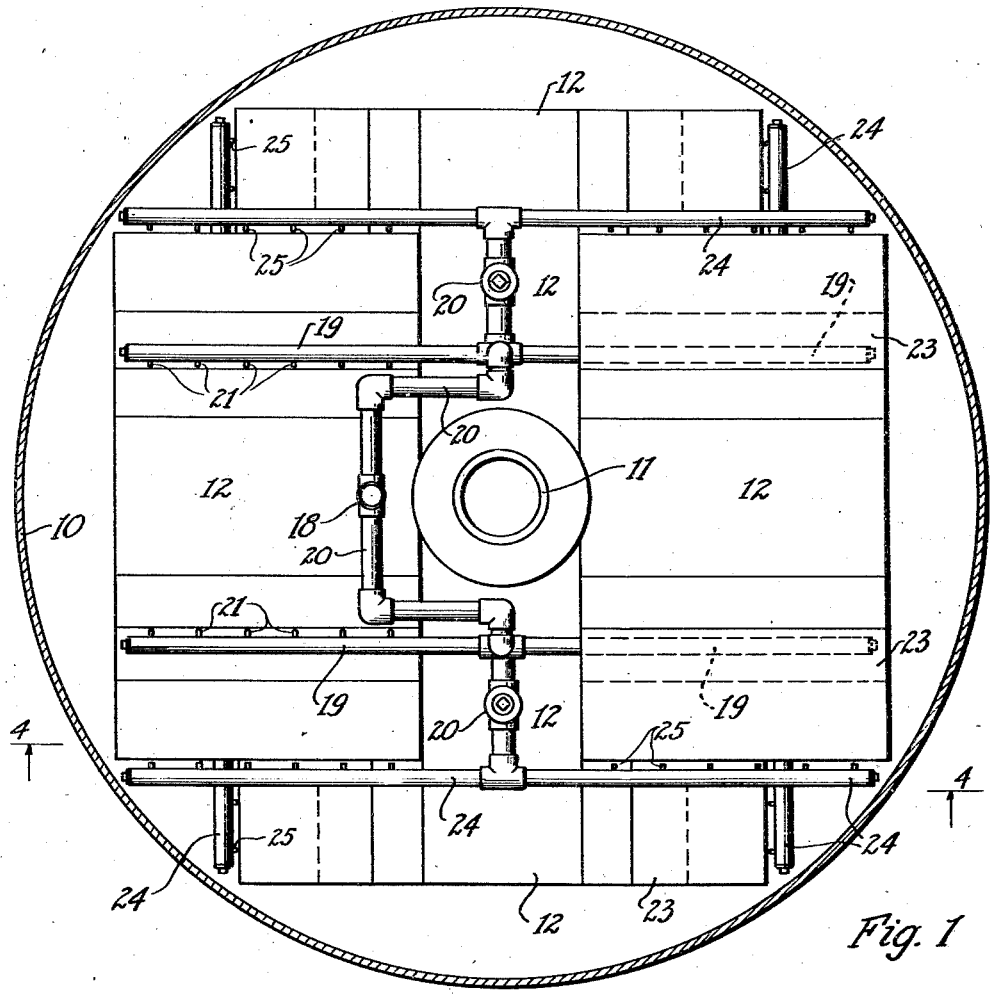

Jan. 21, 1930.   G. M. KIRKPATRICK   1,744,314
FLUID SEPARATOR
Filed March 17, 1924   3 Sheets-Sheet 1

INVENTOR:
George M. Kirkpatrick
By E. J. Andrews
Atty.

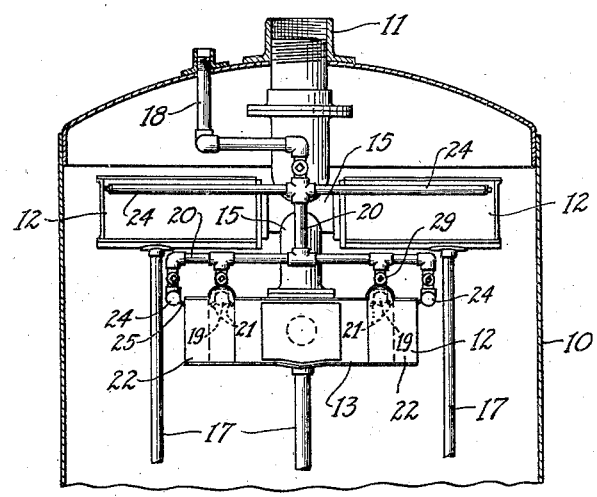
Fig.3
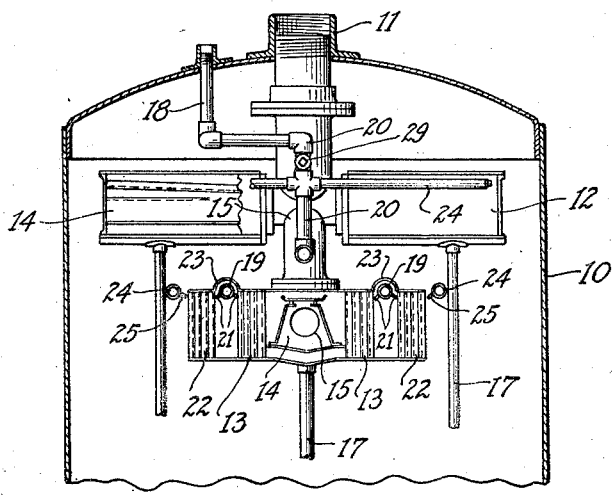
Fig.4
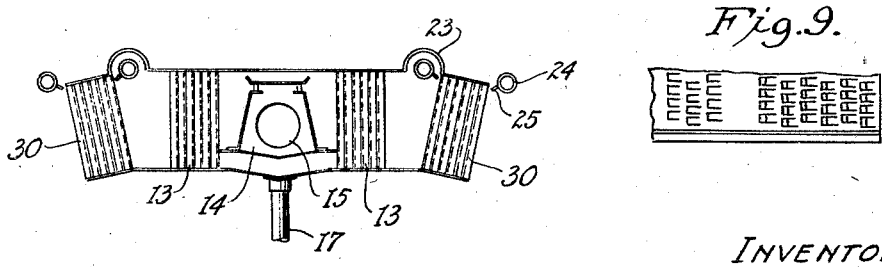
Fig.5
Fig.9.
INVENTOR:
George M. Kirkpatrick
By E. J. Andrews
Atty.

INVENTOR:
George M. Kirkpatrick
By E. J. Andrews
Atty.

Patented Jan. 21, 1930

1,744,314

UNITED STATES PATENT OFFICE

GEORGE M. KIRKPATRICK, OF PITTSBURGH, PENNSYLVANIA, ASSIGNOR, BY MESNE ASSIGNMENTS, TO BLAW-KNOX COMPANY, OF BLAWNOX, PENNSYLVANIA, A CORPORATION OF NEW JERSEY

FLUID SEPARATOR

Application filed March 17, 1924. Serial No. 699,809.

This invention relates to improvements in gas separators or purifiers, and it has for its object providing suitable means for separating impurities such as particles of liquids or solids from gases or vapors and for otherwise purifying the gases. In producing by fractional distillation or otherwise certain liquids or gases, the value of the results often depends very materially upon the purity of the gas which is produced or the vapor from which the desired liquid is obtained by condensation. In such a case it is desirable completely to remove all impurities. This has been substantially provided for by certain mechanical separators, but one object of my invention is to provide improved means for more completely removing the impurities, for instance, from hydrocarbon vapors such as gasoline when it is distilled from the cruder oils.

Another object of the invention is to provide a process for further improving the quality of the vapor produced. In the production of vapors by the cracking process or otherwise the vapor is not usually entirely homogeneous. Even though the process is properly carried out in general, yet there is a tendency for vapors of other densities than that desired to be produced and to mix with the product. But I have found that if the vapor is washed or scrubbed by being brought into intimate contact with a liquid such as reflux liquid, while at the proper temperature and pressure, there is a decided tendency to eliminate the vapors of undesirable densities. The molecules of these vapors are absorbed and retained by the liquid, and are replaced by those which are normal to the existing conditions, and hence are of the desired density.

A further object is to more effectually remove impurities not only from the vapors, but as well from the separators, so as to avoid clogging of the separators and other objectionable results.

My improvement therefore consists in associating the vapor being produced with a suitable liquid as the vapor is passing from the evaporating tower, other distillation unit, or absorber tower, so as to bring the vapor intimately in contact with the liquid. This process not only makes the product more homogeneous, but also assists in removing other impurities. The purified vapor thus produced is then passed through any ordinary mechanical apparatus in order to remove any remaining impurities, such as liquid particles.

Although my invention is applicable to many types of separators, yet for the purpose of illustration I have shown the invention applied to the separator disclosed by the Patent No. 1,570,985, issued to Roger W. Andrews, Jan. 26, 1926, and reference may be had to said patent for details of the separator not material to this invention. In that separator the gases such as steam to be purified are passed through systems of baffles so that a very circuitous route is taken, bringing the gases more or less in contact with the baffles, and the impurities in the gases adhere to the baffles and run down and out of the apparatus, while the purified gases pass out through other passageways. As my apparatus is to purify the gas rather than merely to separate one fluid from another, I prefer to call the units purifiers.

Figure 2:
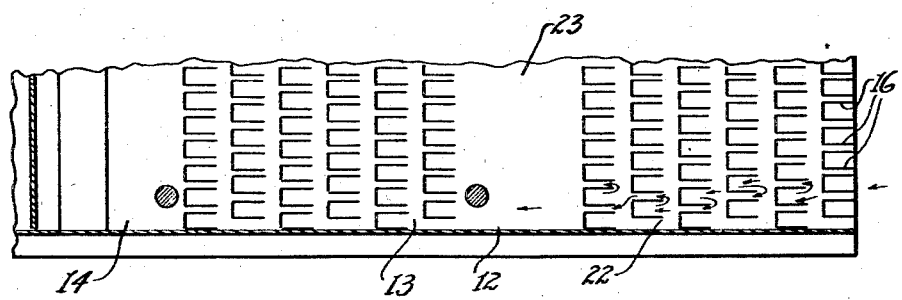
Figure 6:
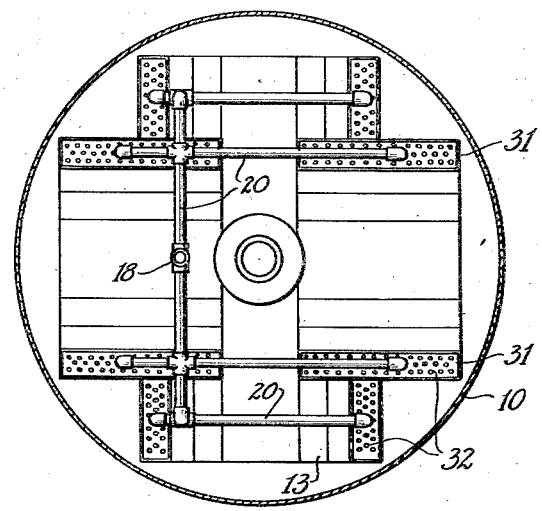
Figure 7:
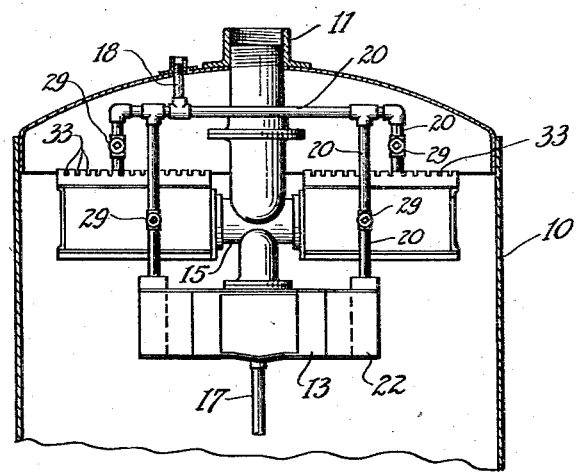
Figure 8:
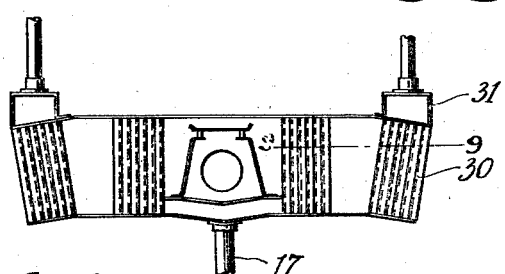

Of the drawings, Fig. 1 is a plan view of a combination of purifiers mounted in an evaporating tower and including apparatus for carrying out the features of my invention; Fig. 2 is an enlarged horizontal sectional view of a portion of a purifier; Fig. 3 is a reduced elevation of the apparatus of Fig. 1; Fig. 4 is a cross section along the line 4—4 of Fig. 1; Fig. 5 is an elevation of a modified purifier; Fig. 6 is a plan view of a combination of purifiers disclosing certain other modifications in the apparatus; Fig. 7 is an elevation of the purifiers of Fig. 6; Fig. 8 is an elevation of another modified purifier; and Fig. 9 is a fractional cross section along the line 9—9 of Fig. 8.

The apparatus which I provide may be used in any boiler or still or tower where it is desired to purify gases or vapors which are formed in or passed through the apparatus. I have illustrated the purifiers as being used in an evaporating tower 10 from which vapors are passing through an outlet 11 and are being purified by means of the combination of four purifying units 12. Any number of units, however, may be used. Each of the purifiers is provided with a bank of channel-shaped baffles 13, and each has an interior vapor chamber 14, which is connected by means of a pipe 15, with the vapor outlet 11; and each purifier has an outlet 17 for the impurities to pass away from the purifier. The vapors passing out may be conducted to any suitable apparatus, and the impurities may be passed back into the tower or may be passed out as is desired. While passing through the purifier the vapor is divided into many narrow streams and it passes through very circuitous routes, as indicated by Fig. 2, and it thus comes into very intimate and frequent contact with the baffle surfaces 16.

The improvements which I have added to the ordinary separator comprises means for supplying a suitable liquid, preferably a reflux liquid, under pressure, in the passageways of the ordinary separator. For this purpose I provide a pipe 18, which is connected to any suitable source of supply under pressure, and which is also connected to the distributing pipes 19 by means of the various pipes 20. These distributing pipes are mounted in any suitable position with reference to the baffle casings, such as at the upper front corners thereof; and perforations are provided for in the pipes through which the purifying liquid may pass in front of or into the spaces between the baffles. In order to properly direct the liquid and also in order to form it into a suitable spray, I prefer to provide the nozzles 21 which are connected to the distributing pipes 19. By the use of these nozzles, the liquid is forced as a spray across the inlets and into the baffle spaces, and not only substantially fills the spaces with the fine spray, but also coats the surfaces 16 of the baffles with the liquid. As a consequence the vapor passing into and through the baffles comes into intimate contact with the purifying liquid of the spray and with the coat on the baffle surfaces. The spray and coat, however, may be confined to the first row or two of baffles if desired, the remaining baffles being substantially dry.

It is sometimes desirable to increase the number of baffles used or to increase the length of the passageways through which the vapor passes, when this cleansing process is used, so as to allow the vapor to pass through dry baffles after they have passed beyond the wet baffles. For this purpose I prefer to provide extra banks of baffles 22 mounted outside of the normal baffles and enclosed in housings 23 so as to close the passageways between the two casings of baffles and prevent the vapor from entering or passing out of the passageways without passing through the baffles. I then provide the distributing pipes 24 suitably connected with the supply pipes and with suitable perforations therein, or preferably with spraying nozzles 25 attached thereto. The vapor then passes through the outer casing of baffles and is thoroughly washed and scrubbed by the liquid spray and coat and then passes to the second casing of baffles, and any remaining impurities are then removed by these dry baffles.

It is sometimes desired to use the purifying liquid in both banks of baffles and in such a case the liquid may be supplied to the nozzles 21 for the inner banks and the nozzles 25 for the outer banks. Valves 29 are supplied to control the flow of the liquid to the various distributing pipes, or individual supply pipes 18 may be provided for the distributing pipes, so as to control the flow by valves outside of the tower. Also the pipes 19 may be supplied with nozzles to pass the liquid back into the outer bank of baffles as well as into the inner banks. Or a single row of nozzles may be provided and by them the liquid may be passed into either bank by merely rotating the distributing pipe 19.

As modification of this apparatus, I provide similar separators and pipe systems, but with the outer banks 30 inclined. When so arranged the liquid sprayed passes into the baffle passageways, but the greater portion runs down and out at the lower edge of the casings.

As a further modification of this apparatus, I provide trays 31, which are mounted on the banks of baffles 13 or 22 or both. These trays may have perforations 32 in their bottoms for distributing the liquid between the individual baffles of the banks; that is for distributing the liquid in the vapor passageways of the baffles and at the same time for directing the liquid against the surfaces of the baffles. In this manner all of the passageways and all of the baffle surfaces may be reached and the vapor thoroughly washed by the liquid throughout its entire passageway. However, the perforations if preferred may be arranged near the outer edges of the trays so that the outer portions of the baffles only will be affected by the liquid. This is desirable when the banks 13 only are used. But if desired the separators may be supplied with banks 22, the outer banks also having trays with perforated bottoms so as to distribute the liquid through the outer banks and the inner banks simultaneously; or by suitable means, such as the valves 29, the liquid may be directed to either of the sets of banks as may be desired.

When perforated trays of this nature are used the trays may be open at the top and the liquid distributed merely by the force of gravity, or the trays may be closed and sealed, and the liquid forced out under pressure.

In case the trays are used which are not closed the sides of the trays may have apertures therein or notches 33 thereon, Fig. 7, so that the liquid may be distributed through these notches or apertures into the baffle chambers. Such an arrangement would be of value in preventing overflow of the trays in an undesirable manner. If overflow is provided through these notches, the liquid will be directed into the baffles so as to be of service. Or the notches may be used in place of the perforations 32.

The trays may also be applied to the inclined banks, Fig. 8. In such a case the liquid passes downwardly in the baffle passageways against the incoming vapor, and then drops off of the lower front edges of the baffles to the liquid below the purifier.

By this process the vapor is not only thoroughly cleaned but it is also purified; vapors of undesirable molecular phases being eliminated; the selectivity of the distillation process is increased so that a more refined product results; and the impurities are more completely removed and carried out of the purifiers. The additional purifying liquid supplied assists materially in washing impurities such as carbon out of the baffles and preventing clogging thereof.

Although I have described my invention as used in connection with certain vapor cracking processes, yet it is to be understood that it may be applied to other cracking processes and also to various other vapor and gas purifying processes; and for such purposes modifications in the apparatus which I have described may be made by those skilled in the art, without departing from the spirt of my invention, as disclosed by the following claims. It is also to be understood that the number of separator units that are used is not material so far as my invention is concerned; one or more being used as may be desired.

I claim as my invention:

1. A gas purifier comprising a casing having a gas inlet and a gas outlet, a bank of inclined channel-shaped baffles mounted in said casing between said inlet and outlet, and means for passing a liquid into the upper ends of said baffles, said means being mounted outside of said casing.

2. A gas purifier comprising a casing having a gas inlet and a gas outlet, a bank of inclined baffles mounted in said casing between said inlet and outlet, said baffles being channel-shaped, and means for passing a liquid into the upper ends of said baffles, said means being mounted outside of said casing, said casing having perforations through its wall between said means and the upper ends of said baffles.

3. A gas purifier comprising a casing having a gas inlet and a gas outlet, and a chamber connecting said inlet and outlet, a bank of baffles inclined to the vertical mounted in said chamber, and means mounted above said baffles for passing a liquid across said inlet and into the passageways around said baffles, said means comprising means for passing a liquid onto the upper wall of said casing above said baffles, said upper wall having perforations therethrough.

4. A gas purifier comprising a main casing having a gas inlet and outlet and a chamber connecting said inlet and outlet, a bank of baffles mounted in said chamber, and means for passing a liquid across said inlet and into the passageways around said baffles, said means comprising a second casing mounted on said bank and having perforations in its bottom, the bottom of the main casing beneath said baffles being inclined downwardly and outwardly.

5. A gas purifier comprising a casing having a gas inlet and outlet and a chamber connecting said inlet and outlet, a bank of baffles mounted in said chamber, and means for passing a liquid across said inlet and into the passageways around said baffles, said means comprising a closed casing mounted on said bank and having perforations in its bottom, and means for passing a liquid under pressure into said casing.

6. A gas purifier comprising a casing having a gas inlet and a gas outlet, and a chamber connecting said inlet and outlet, a bank of baffles mounted in said chamber, and means mounted above said baffles for passing a liquid across said inlet and into the passageways around said baffles, said means comprising means for passing a liquid onto the upper wall of said casing above said baffles, said upper wall having perforations therethrough.

In testimony whereof, I hereunto set my hand.

GEORGE M. KIRKPATRICK.